United States Patent [19]

Langstein et al.

[11] Patent Number: 5,587,424
[45] Date of Patent: Dec. 24, 1996

[54] MIXTURE OF FLUOROCARBON RUBBER AND SILICONE/ACRYLATE CORE/SHELL RUBBER

[75] Inventors: Gerhard Langstein, Kürten; Ralf Krüger, Köln; Karl-Erwin Piejko, Bergisch Gladbach; Ulrich Eisele, Leverkusen; Leo Morbitzer, Köln, all of Germany

[73] Assignee: Bayer Aktiengesellschaft, Leverkusen, Germany

[21] Appl. No.: 456,348

[22] Filed: Jun. 1, 1995

Related U.S. Application Data

[63] Continuation-in-part of Ser. No. 259,949, Jun. 15, 1994, abandoned.

[30] Foreign Application Priority Data

Jun. 22, 1993 [DE] Germany .................. 43 20 633.6

[51] Int. Cl.$^6$ .................. C08L 27/12; C08L 27/18; C08L 27/20
[52] U.S. Cl. .................. 525/63; 525/474; 525/479; 525/416; 525/902
[58] Field of Search .................. 525/63, 474, 479, 525/416, 902

[56] References Cited

U.S. PATENT DOCUMENTS

| | | | |
|---|---|---|---|
| 4,810,577 | 3/1989 | Ikegaya | 428/391 |
| 5,223,586 | 6/1993 | Martner et al. | 525/477 |

*Primary Examiner*—W. Robinson H. Clark
*Attorney, Agent, or Firm*—Sprung Horn Kramer & Woods

[57] ABSTRACT

Novel vulcanizable mixtures comprising silicone-core, acrylate-shell rubber particles dispersed within a fluorocarbon rubber.

7 Claims, 5 Drawing Sheets

Tg
Tg – 20K
Tg – 40K
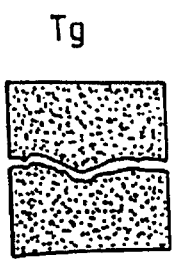
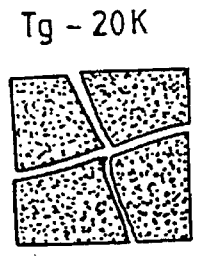
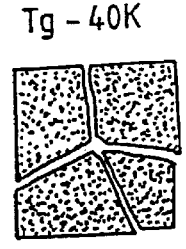
Fig. 5A
Fig. 5B
Fig. 5C
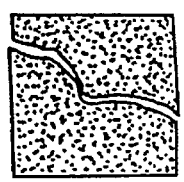
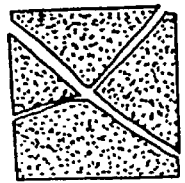
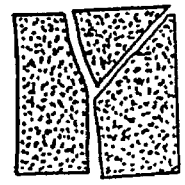
Fig 5D
Fig 5E
Fig. 5F
Tg
Tg –20K
Tg –40K
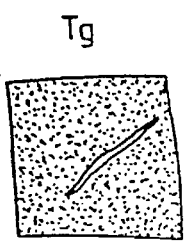
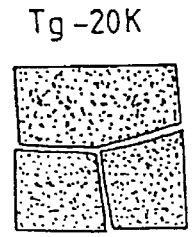
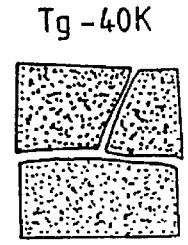
Fig. 6A
Fig. 6B
Fig. 6C
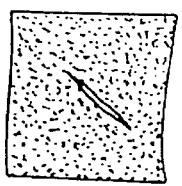
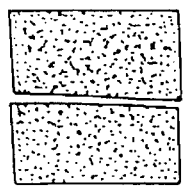
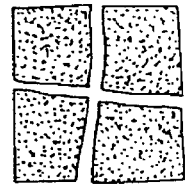
Fig 6D
Fig 6E
Fig. 6F

MIXTURE OF FLUOROCARBON RUBBER AND SILICONE/ACRYLATE CORE/SHELL RUBBER

This is a continuation in part of U.S. patent application Ser. No. 08/259,949 filed Jun. 15, 1994, now pending.

The present invention relates to peroxidically vulcanisable mixtures of fluorocarbon rubber and silicone/acrylate core/shell rubbers.

The preferred materials for use in high-temperature applications (gaskets, seals, linings, etc.), particularly in the presence of aggressive media which may also be combined with oil or fuel, are fluoroelastomers (FKMs) based on vinylidene fluoride, hexafluoropropene and optionally tetrafluoroethylene. These yield vulcanisates having high resistance to heat, chemicals, ozone and weathering, plus low swelling in oil and fuel.

These attributes have opened up to fluorocarbon rubbers fields of application hitherto closed to any other type of rubber. However, a substantial disadvantage of FKMs is their extraordinarily poor low temperature flexibility. At temperatures below the glass transition temperatures, which in the case of vulcanizates of the conventional commercial VDF/HFP/TFE-based fluoroelastomers vary between 0° and −15° C., FKM finished components are subject to very rapid failure under mechanical stress, and are extremely brittle.

At the same time, polydimethylsiloxanes provide polymers which have an extremely low $T_g$ of −123° C. and which excel in terms of low hot air ageing and high ozone resistance, and which are, moreover, more economical than the FKMs. This class of rubbers in turn has disadvantages in terms of solvent resistance and mechanical properties. Even the more costly fluorosilicones (trifluoropropyl substituents) which have a glass transition temperature of −68° C. do not attain the resistance values of FKMs in hot, aggressive media.

Much effort has therefore been directed towards combining fluorocarbon rubbers and silicone rubbers. The obvious combination in the form of a simple blend, however, is destined to fail because the two classes of polymers are incompatible.

A multi-phase blend system might bring synergistic advantages to certain application-related properties, for example improved low temperature brittle point, while retaining the advantageous swelling and ageing properties of FKMs, if the FKM phase and the silicone phase could be successfully prepared in a defined morphology and this could be subsequently fixed by cross-linking. Attempts to prepare such systems generally fail, either because when the two partners, which contain cross-linking groups of similar reactivity, are being mixed it is not possible to obtain uniform morphology, or because the phases fail to couple, because of the presence of disparate cross-linking characteristics and cross-linking therefore takes place preferentially within the pure phases A and B. Co-vulcanization then takes place only to a minor degree.

The object of the present invention is to prepare a radically vulcanizable blend of a fluorocarbon rubber and a silicone rubber of defined morphology. The silicone rubber should for this be distributed in finely dispersed manner in a matrix of the FKM and be firmly bonded to the latter during a subsequent cross-linking operation.

This object is achieved according to the invention in that an acrylate segment is grafted on to silicone rubbers in the form of particles having a defined particle size in an aqueous dispersion, and the resulting silicone/acrylate core/shell rubbers are mixed with fluorocarbon rubbers, which are at least partially compatible and are (preferably radically) co-cross-linkable with the acrylate graft. Surprisingly, the original morphology is retained in the composition and procedure according to the invention, and coupling takes place between the silicone phase and fluorocarbon rubber phase, which manifests itself in good mechanical properties (retention of the high elongation and strength values of the starting components) above the $T_g$ of FKM and in improved low temperature brittle point below the glass transition temperature of the FKM component, as compared with pure FKM.

The present invention accordingly provides radically cross-linkable mixtures containing from 98 to 35 parts by weight of a radically vulcanizable fluorocarbon rubber (A) and from 2 to 65 parts by weight of a silicone/acrylate core/shell rubber (B) having a silicone moiety of from 95 to 5 parts by weight and accordingly an acrylate moiety of from 5 to 95 parts by weight. The silicone/acrylate core/shell rubber is characterized in that it comprises an at least partially cross-linked core of polyorgano-siloxane and a mantle (shell) grafted thereto of an at least partially cross-linked acrylate copolymer which is at least partially compatible with the FKM to be utilized as partner in the blend, and exhibits a particle diameter of from 60 to 800 nm.

The invention also provides a process for the preparation of the aforementioned mixture, which is characterized in that the fluorocarbon rubber (A) and the silicone/acrylate core/shell rubber (B) are mixed together in the form of aqueous dispersions thereof and are co-precipitated out of the resulting mixed emulsion or are utilised directly in this form as a coating component and are in each case cross-linked in subsequent processing steps.

Suitable fluoroelastomers (A) which are peroxidically cross-linkable are those such as contain units of VDF and/or TFE and at least one further fluoro-olefin which is copolymerizable therewith. The further fluoro-olefin may be CTFE, HFP, PFP, HFIB, PFAVE, and the like. The fluoroelastomer may additionally contain units of non-fluorine-containing monomers such as propene, ethylene, vinyl alkyl ether and vinyl ester. Monomer combinations which yield such fluoroelastomers are fundamentally known and are described, for example, in DE-A 39 25 743 and DE-A 41 14 598. The fluorocarbon rubber must additionally possess reactive sites for the peroxidic cross-linking. This requirement can be met by both bromine or iodine, or bromine and iodine, substituents, and also by double bonds in the side position. In the case of the bromine and iodine substituents, such reactive sites are introduced into the fluoroelastomer in accordance with known processes, either by copolymerizing bromine and/or iodine-containing vinyl compounds in small quantities with the fluoromonomers; see, for example, U.S. Pat. No. 3,351,619, U.S. Pat. No. 4,035,565, U.S. Pat. No. 4,214,060, DE-A 3,715,210, or by polymerizing in the presence of saturated iodine or bromine and iodine-containing compounds, for example DE-A 2,815,187, DE-A 3,710,818, or combining the two possibilities, for example, EP-A 407,937 or U.S. Pat. No. 4,948,852. A fluorocarbon rubber having double bonds in the side position is obtained by copolymerizing fluoromonomers with small quantities of suitable monomers which have at least two olefinic double bonds, such as alkenyl isocyanurates, alkenyl cyanurates and/or unconjugated dienes, see DE-A 4,038,588 and DE-A 4,114,598.

Silicone/acrylate core/shell rubbers (B) within the meaning of the invention contain particulate, highly cross-linked silicone rubber particles of an average diameter ($d_{50}$) of from 0.1 to 3 μm, in particular from 0.1 to 1 μm, and gel contents greater than 60 wt-%, in particular greater than 80 wt-%. The acrylate rubber which is grafted on to the silicone rubber particles is present in the silicone/acrylate core/shell rubbers preferably in quantities of 50 wt-% or less, in particular in quantities of from 30 to 5 wt-%. The grafted rubbers (B) preferably have gel contents >70 wt-%, in particular >85 wt-%. The acrylate rubber moiety of the silicone/acrylate core/shell rubbers is polymerized on to the silicone rubber particles; the following can thus form: graft polymers in the sense of covalent compounds of silicone rubber and acrylate rubber, cross-linked acrylate rubber moieties which encase the silicone rubber particles in a manner more or less mechanical, and optionally small quantities of soluble acrylate rubbers. Within the meaning of the invention, silicone/acrylate core/shell rubbers designate the reaction products which are obtained by polymerization of acrylate in the presence of silicone rubber particles, irrespective of the actual extent of grafting. The silicone rubber backbone is preferably a cross-linked silicone rubber, and contains units of the formulae (I) to (IV)

| $R_2SiO_{2/2}$ | $RSiO_{3/2}$ | $R_3SiO_{1/2}$ | $SiO_{4/2}$ |
|---|---|---|---|
| (I) | (II) | (III) | (IV), | in which

R represents a monovalent organic radical.

$C_1$–$C_{40}$ radicals, for example alkyl groups, preferably $C_1$–$C_{10}$-alkyl, aryl groups, preferably $C_6$–$C_{24}$-aryl, alkylaryl groups, preferably $C_7$–$C_{30}$-alkylaryl, arylalkyl groups, preferably $C_7$–$C_{30}$-aralkyl, $C_1$–$C_{20}$-alkoxy, $C_1$–$C_{20}$-thioalkyl, unsaturated $C_2$–$C_{20}$ radicals, and the like are suitable as monovalent organic radicals.

The following might be named particularly preferably: methyl, ethyl, t-butyl, phenyl, methylphenyl, bisphenyl, phenylmethyl, and the like. The following might furthermore be named: $C_1$–$C_{10}$-alkoxy radicals, radically attacking groups such as vinyl radicals or mercaptopropyl radicals.

At least 80% of all radicals R are preferably methyl; combinations of methyl and ethyl are in particular preferred.

Preferably from 0 to 10 mole of $RSiO_{3/2}$ units, from 0 to 1.5 mole of $R_3SiO_{1/2}$ units and from 0 to 3 mole of $SiO_2$ units are preferably used per 100 mole of $R_2SiO$ units.

Preferred silicone rubbers contain incorporated units of radically attackable groups. These are rendered capable of radical addition or transfer reaction. Such groups are preferably vinyl, allyl, chloroalkyl and mercapto groups, preferably in quantities of from 2 to 10 mole-%, calculated on the radicals R.

The rubber polymer b) grafted on to the core a) represents a partially to highly cross-linked acrylate rubber and is a polymer of from 100 to 60 wt-% alkyl acrylate, from 60 to 0 wt-% of other monomers which are copolymerizable with alkyl acrylate, and, if necessary, from 0.1 to 10 wt-%, calculated on the sum of alkyl acrylate and other monomers, of a cross-linking monomer having at least two vinyl and/or allyl groups in the molecule.

Alkyl acrylates within the meaning of the invention are $C_4$–$C_{14}$-alkyl acrylates, such as methyl, ethyl, butyl, octyl and 2-ethylhexyl acrylate, chloroethyl acrylate, benzyl acrylate, phenethyl acrylate, in particular $C_1$–$C_6$-alkyl esters, preferably butyl acrylate; monomers which are copolymerizable with the alkyl acrylates are preferably styrene, α-methylstyrene, halostyrene, methoxystyrene, acrylonitrile, methacrylonitrile, $C_1$–$C_8$-alkyl methacrylates which may be substituted in the alkyl radical optionally by functional groups such as hydroxyl, epoxy or amine groups, for example methyl methacrylate, cyclohexyl methacrylate, glycidyl methacrylate, hydroxyethyl methacrylate, hydroxypropyl methacrylate, (meth)acrylic acid, maleic acid (ester), fumaric acid, itaconic acid, (meth)acrylamides, vinyl acetate, vinyl propionate or N-methylol compounds of (meth)acrylamides.

Cross-linking monomers within the meaning of the invention are esters of unsaturated carboxylic acids having a polyol (preferably from 2 to 20 carbon atoms in the ester group), such as ethylene glycol dimethacrylate, esters of a polyfunctional carboxylic acid having an unsaturated alcohol (preferably from 8 to 30 carbon atoms in the ester radical), such as triallyl cyanurate, triallyl isocyanurate; divinyl compounds such as divinylbenzene; esters of unsaturated carboxylic acids having unsaturated alcohols (preferably from 6 to 12 carbon atoms in the ester radical) such as allyl methacrylate; phosphoric acid esters, for example triallyl phosphate and 1,3,5-triacrylolylhexahydro-s-triazine. Particularly preferred polyfunctional monomers are triallyl cyanurate, triallyl isocyanurate, triallyl phosphate and allyl methacrylate.

The silicone/acrylate core/shell rubbers within the meaning of the invention may be prepared in aqueous emulsion in the following manner: in a first stage, the silicone rubber, that is to say the core a), is first prepared by emulsion polymerizing a silicone oligomer.

It is known to prepare an emulsion of a long-chain silicone oil terminating with OH groups by emulsion polymerization. For example, reference in this context is made to U.S. Pat. No. 2,891,910 and to GB-A 1,024,024. It is particularly preferable to emulsion polymerize in the presence of an alkylbenzene sulphonic acid, because in this instance emulsifier and polymerization catalyst are present in one. The acid is neutralized following polymerization.

n-Alkylsulphonic acids may also be utilized in place of the alkylbenzene sulphonic acids. It is possible to utilize additionally other emulsifying agents as co-emulsifiers, in addition to the sulphonic acid which has a catalytic and emulsifying action.

Co-emulsifiers may be nonionic or anionic. Anionic co-emulsifers which are in particular contemplated are salts of the aforementioned n-alkyl- or alkylbenzene sulphonic acids. Nonionic co-emulsifers are polyoxyethylene derivatives of fatty alcohols and fatty acids.

Silicone oils obtained by emulsion polymerization in the presence of nonionic co-emulsifiers are generally of lower molecular weight than those prepared without co-emulsifier. The molecular weight of the silicone oil terminating with OH groups which is obtained in the emulsion polymerization can also be influenced by way of the temperature at which equilibrium is reached between siloxane, water and the silanol which first forms as a result of opening the siloxane ring. Radically attackable groups may be incorporated in the preferred silicone polymer by co-use of appropriate siloxane oligomers. Suitable siloxane oligomers here are for example tetramethyl tetravinyl cyclotetrasiloxane, γ-mercaptopropyl methyldimethoxysilane and the hydrolysate thereof.

Such "functional" oligomers are added to the basic oligomer, for example octamethylcyclotetrasiloxane, in the requisite quantities.

Longer-chain alkyl radicals R, for example ethyl groups, propyl groups, and phenyl groups may also be incorporated in an analogous manner. The silicone rubber must be at least partially cross-linked.

Sufficient cross-linking can already take place when the preferably present vinyl groups and mercaptopropyl groups react together during emulsion polymerization of the siloxane oligomers. It is not then necessary to add an external cross-linking agent; however, a cross-linking silane may be added in order to increase the degree of cross-linking of the silicone rubber.

Branching or cross-linking may be built in by addition of, for example, tetraethoxysilane or of a silane of the general formula $RSiX_3$ or $RX_4$ (wherein X represents a hydrolysable group, in particular the alkoxy radical). R has the meaning described heretofore. Preferably R=methyl, R=ethyl and R=phenyl. Methyltrimethoxysilane or phenyltrimethoxysilane are in particular preferred in addition to tetraethoxysilane.

In a second stage the monomers (alkyl acrylate, optionally cross-linking monomers and optionally further monomers) which form the acrylate rubber b) are then graft polymerized in the presence of the silicone rubber emulsion of the first stage. Formation of new particles should be as far as possible suppressed during this graft polymerization. An emulsion stabilizer must be present in the quantity necessary for covering the surface of the particles. Graft polymerization is preferably accomplished within the temperature range 30° to 90° C., in particular 50° to 80° C., and is initiated by known radical initiators, for example, azo-initiators, peroxides, peresters, persulphates, perphosphates or by redox initiator systems. Water-soluble inorganic peroxydisulphates and peroxydiphosphates are preferred. Following the graft polymerization of b) on to the silicone rubber particles a), stable aqueous emulsions of the silicone rubber/acrylate rubber particles arise, normally with polymer solids contents within the range 20 to 50 wt-%.

The graft polymers thus prepared may be worked up by known processes, for example by coagulating the latices with electrolytes (salts, acids or mixtures thereof). They may then be purified and dried.

The mixture is formed according to the invention preferably by mixing the aqueous dispersion of the fluorocarbon rubber (A) with the aqueous dispersion of the silicone/acrylate core/shell rubber (B), optionally with addition of further processing agents, additives, etc. This mixture of the aqueous dispersions is either utilized directly in this form, for example as a coating component or as an additive for coating components, or is precipitated. Other procedures are possible, such as mixing the individual coagulated, dry solid rubbers in a roll mill or in internal mixers, by extrusion, etc.

The rubber mixtures according to the invention may be cross-linked radically using conventional methods. Radical initiation may be by high-energy radiation or thermally in the presence of radical initiators. Peroxides which exhibit decomposition half-lives of at least 5 minutes at temperatures above 100° C., such as for example dibenzoyl peroxide, t-butylperoxybenzene, bis-(t-butylperoxy-isopropyl)-benzene, 2,5-bis-(t-butylperoxy)-2,5-dimethylhexane or 2,5-bis-(t-butylperoxy)-2,5-dimethylhexine-(3), preferably serve as radical initiators. The peroxides are preferably utilized in quantities of from 0.5 to 10 parts by weight, preferably from 1 to 5 parts by weight, in each case calculated on 100 parts by weight of the polymer mixture.

The cross-linkable mixture may furthermore contain, serving as acid acceptor, oxides or hydroxides of metals such as magnesium, calcium, lead, zinc, barium and the like or of a basic salt having an organic acid radical, such as sodium stearate, magnesium oxalate or carbonates or basic lead phosphate and the like, or combinations of a plurality thereof in proportions not exceeding 15 parts by weight, calculated on 100 parts by weight of polymer.

It is possible to add further known fillers, reinforcing agents, plasticizers, lubricants, processing agents, pigments, and the like, the fillability of the rubber mixture according to the invention being as a matter of principle greater than that of the pure fluorocarbon rubber.

The aforementioned mixture constituents are also incorporated into the rubber mixture according to the invention using conventional methods of forming a mixture. Thus, for example, the mixtures according to the invention, which are to afford high-elasticity molded bodies, may be processed on a roll mill or in a mixer into vulcanizing mixtures which are then vulcanized in known manner at elevated temperatures and under pressure in forming devices, and are then post-cured without pressure in forced air ovens in order to adjust the final properties.

It is equally possible to process in solution or in the melt, wherein after forming at elevated temperatures, drying and cross-linking may be accomplished in a single step, if for example molded bodies in the form of sheets, films, fibers or compact molded bodies are prepared. A liquid composition optionally prepared with solvent is eminently suitable for use in coatings or sealing masses.

The aqueous mixed emulsions already mentioned above are also, with the appropriate additives, utilizable directly for casting, after which they may be dried and cured.

Curing may optionally also be effected by UV or high-energy radiation, without the need for heat treatment.

The invention is explained in greater detail in the examples which follow:

EXAMPLE 1a

Preparation of a Fluorocarbon Rubber Emulsion 15,000 ml deionized water was placed in a 40 liter autoclave. 54 g lithium perfluorooctyl sulphonate and 90 g potassium peroxydisulphate were dissolved in the water. This solution has a pH of 11. The closed autoclave was then raised three times to a nitrogen pressure of in each case 10 bar, the pressure then being reduced to normal. 4230 g hexafluoropropene and 2938 g vinylidene fluoride, and 3 g perfluorobutyl iodide and 24 ml of a solution (=solution 1) of 13 g triallyl isocyanurate in acetic acid methyl ester were added to the autoclave and the reaction mixture was heated to 50° C. with stirring. The pressure within the autoclave was 35 bar after reaching this temperature. Polymerization was initiated by continuous addition of 120 ml per hour of an aqueous solution (=solution 2) containing triethanolamine in a concentration of 75 g/l. Parallel to this, continuous addition of 30 ml/h of solution 1 commenced. After 90 minutes, dispensing of solution 2 was reduced to 90 ml/h. During polymerization, which manifested itself after 20 minutes by an incipient fall in pressure, the initial pressure was maintained by pressure from continuous introduction over a period of 80 minutes of a monomer mixture of 1430 g vinylidene fluoride and 970 g hexafluoropropene. The contents of the autoclave were cooled to terminate polymerization, and the unreacted gas mixture was condensed and recovered. A coagulate-free aqueous emulsion exhibiting a pH of 4.9 at a solids content of 19%, was obtained. The emulsion was utilized in this form directly for the preparation of the mixtures in accordance with Examples 1d to 9.

COMPARATIVE EXAMPLE

The emulsion in accordance with Example 1 a was acidulated to pH approximately 2 with dilute sulphuric acid, and was precipitated with a 4% aqueous magnesium sulphate solution (3500 ml to 500 g solid rubber). The product was washed with water and then dried, to give a rubber-like copolymer containing vinylidene fluoride, hexafluoropropene and triallyl isocyanurate, incorporating iodine as end groups.

The copolymer is soluble in solvents such as dimethylformamide, dimethylacetamide, acetone, methyl ethyl ketone and tetrahydrofuran. The molar ratio of vinylidene fluoride to hexafluoropropene in the copolymer, determined by $^{19}F$ nuclear resonance spectroscopy, was 81:19. The TAiC combined in the polymer, determined by elemental analysis for nitrogen, was 0.6 wt-%. An iodine content of <100 ppm was determined by elemental analysis for iodine. The Mooney $ML_4$ (100° C.) of the raw polymer is 150.

EXAMPLE 1b

Preparation of the Silicone Rubber Backbone 38.4 parts by weight octamethylcyclotetrasiloxane, 1.2 parts by weight tetramethyltetravinylcyclotetrasiloxane and 1 part by weight γ-mercaptopropylmethyldimethoxysilane are stirred together. 0.5 parts by weight dodecylbenzenesulphonic acid are added, and 58.4 parts by weight water are then dispensed over a period of 1 h. Intensive stirring follows. The preliminary emulsion is homogenized twice at 200 bar with the aid of a high pressure emulsifying machine. A further 0.5 part by weight dodecylbenzenesulphonic acid is added.

The emulsion is stirred at 85° C. for 2 hours and then at room temperature for 36 hours Neutralization is with 1N-NaOH. 100 parts by weight of a stable emulsion having a solids content of approximately 37% (determined per DIN 53 182) are obtained. Particle size is 285 nm (average value $d_{50}$). The gel content of the polymer is 83 wt-% (measured in toluene).

EXAMPLE 1c

Preparation of the Silicone/Acrylate Core/Shell Rubber Dispersion 1960 wt-% of the silicone emulsion from Example 1b and 115 parts by weight water are placed in a reactor under a slow nitrogen stream, and are heated to 70° C. A solution of 2 parts by weight potassium peroxydisulphate and 80 parts by weight water is added. At 70° C. the following flows are then added in concurrently over a period of 5 hours:

| Flow 1: | 310 parts by weight n-butyl acrylate |
| | 0.9 parts by weight triallyl cyanurate |
| Flow 2: | 6.5 parts by weight sodium salt of $C_{14}$–$C_{18}$-alkylsulphonic acids |
| | 400 parts by weight water. |

After dispensing is complete, stirring continues at 70° C. for 4 hours. A latex having a 36% solids content is obtained.

EXAMPLE 1d

Preparation of the Rubber Mixture

The coagulate-free fluorocarbon rubber emulsion obtained in Example 1a and the silicone/acrylate core/shell rubber emulsion obtained in Example 1c are mixed in the ratio 90 parts by weight fluorocarbon rubber: 10 parts by weight silicone/acrylate core/shell rubber (in each case calculated on polymer solids content). The silicone/acrylate core/shell rubber comprises 70 parts by weight silicone rubber in accordance with Example 1b and 30 parts by weight silicone/acrylate rubber in accordance with Example 1c.

615.31 g fluorocarbon rubber emulsion (solids content: 21.94%) are stirred thoroughly with 49.31 g silicone/acrylate core/shell rubber emulsion (solids content: 35.45%).

The emulsion is then acidulated with dilute sulphuric acid to pH approximately 2, and precipitated with a 4% aqueous magnesium sulphate solution (0.2 g $MgSO_4$ in 5 g $H_2O$ per g solid rubber). The solid is separated, washed with water and dried.

EXAMPLE 2

The procedure is as for Example 1d, but with the fluorocarbon rubber and the silicone/acrylate core/shell rubber being mixed in the ratio 60 parts by weight: 40 parts by weight (calculated on polymer solids content). For this purpose 410 g fluorocarbon rubber emulsion (solids content 21.94%) and 169.25 g silicone/acrylate core/shell rubber emulsion (solids content: 35.45%) are stirred thoroughly.

EXAMPLE 3

The procedure is as for Example 1d, but with the fluorocarbon rubber and the silicone/acrylate core/shell rubber being mixed in the ratio 40 parts by weight: 60 parts by weight (calculated on polymer solids content). For this purpose 273 g silicone/acrylate core/shell rubber emulsion (solids content 35.45%) are stirred thoroughly.

EXAMPLES 4 TO 9

Examples 4 to 6 and 7 to 9 are effected in a manner analogous to that of Examples 1d to 3. Table 1 gives detailed information.

TABLE 1

| Example No. | FKM emulsion from Example 1a [g] | S/A-K/M emulsion from Example 1c) [g] (% solids) | Si moiety in S/A-K/M rubber [wt.-%] mixture | FKM/S/A-K/M ratio in mixture |
| --- | --- | --- | --- | --- |
| 1d | 615.31 | 49.31(35.45) | 70 | 90:10 |
| 2 | 410 | 169.25(35.45) | 70 | 60:40 |
| 3 | 273 | 253.87(35.35) | 70 | 40:60 |
| 4 | 615.31 | 48(36.5) | 50 | 90:10 |
| 5 | 410 | 164(35.5) | 50 | 60:40 |
| 6 | 273 | 246(36.5) | 50 | 40:60 |
| 7 | 615.31 | 48.2(36.4) | 30 | 90:10 |
| 8 | 410 | 165(36.4) | 30 | 60:40 |
| 9 | 273 | 247(36.4) | 30 | 40:60 |

Abbreviations:
FKM = fluorocarbon rubber; S/A-K/M = silicone/acrylate core/shell rubber

Vulcanization

A mixture of 100 parts by weight rubber mixture (from Examples 1d and 4 to 9, the products from Examples 2 and 3 were no longer workable) with 3 parts by weight of calcium hydroxide, 30 parts by weight carbon black, MT black N 990, 4 parts by weight Percalink 301-50 (triallyl isocyanurate, 50% concentration in inert fillers) and 3 parts by weight Luperco 101 XL (2,5-dimethyl-2,5-bis(t-butyl-)hexane, 45% concentration in inert fillers) is prepared on a two-roll mill for rubber mixing. This mixture was pressure-vulcanized at 200 bar for 15 minutes at a temperature of 175° C. Post-curing then followed by heating the molded bodies (100×100×1 mm pressed plates) stepwise in a forced air oven over a period of 4 hours at the said temperature. The results of mechanical examination of these vulcanizates are shown in Table 2 (the vulcanizate using the product from Example 9 gives a brittle plate).

TABLE 2

| Examples No. | Compar. | 1d | 4 | 5 | 6 | 7 | 8 | 9 |
|---|---|---|---|---|---|---|---|---|
| N/mm² at 100% elongation | 4.24 | 4.97 | 5.15 | 7.52 | — | 5.12 | 7.52 | — |
| Elongation at break [%] | 430.2 | 386.8 | 419.3 | 132.1 | 93.2 | 466.8 | 145.6 | — |
| Stress at break [N/mm²] | 21.9 | 13.5 | 13 | 9 | 8.4 | 14.1 | 9.2 | — |
| $T_g(1)$ [°C.] | −17.9 | −17.9 | −16.7 | −18.1 | −16.4 | −16.1 | −17.4 | — |
| $T_g(2)$ [°C.] | — | −131.1 | −130.8 | −125.7 | −122.9 | −131 | −125.6 | — |

The glass transition temperatures ($T_g(1)$ and $T_g(2)$) indicated in Table 2 were determined by plotting module curves on a Brabender torsional oscillation measuring apparatus.

The invention will be further described with reference to the accompanying drawings wherein:

FIGS. 5 and 6 show the results and plate penetration tests.

Figure 1:
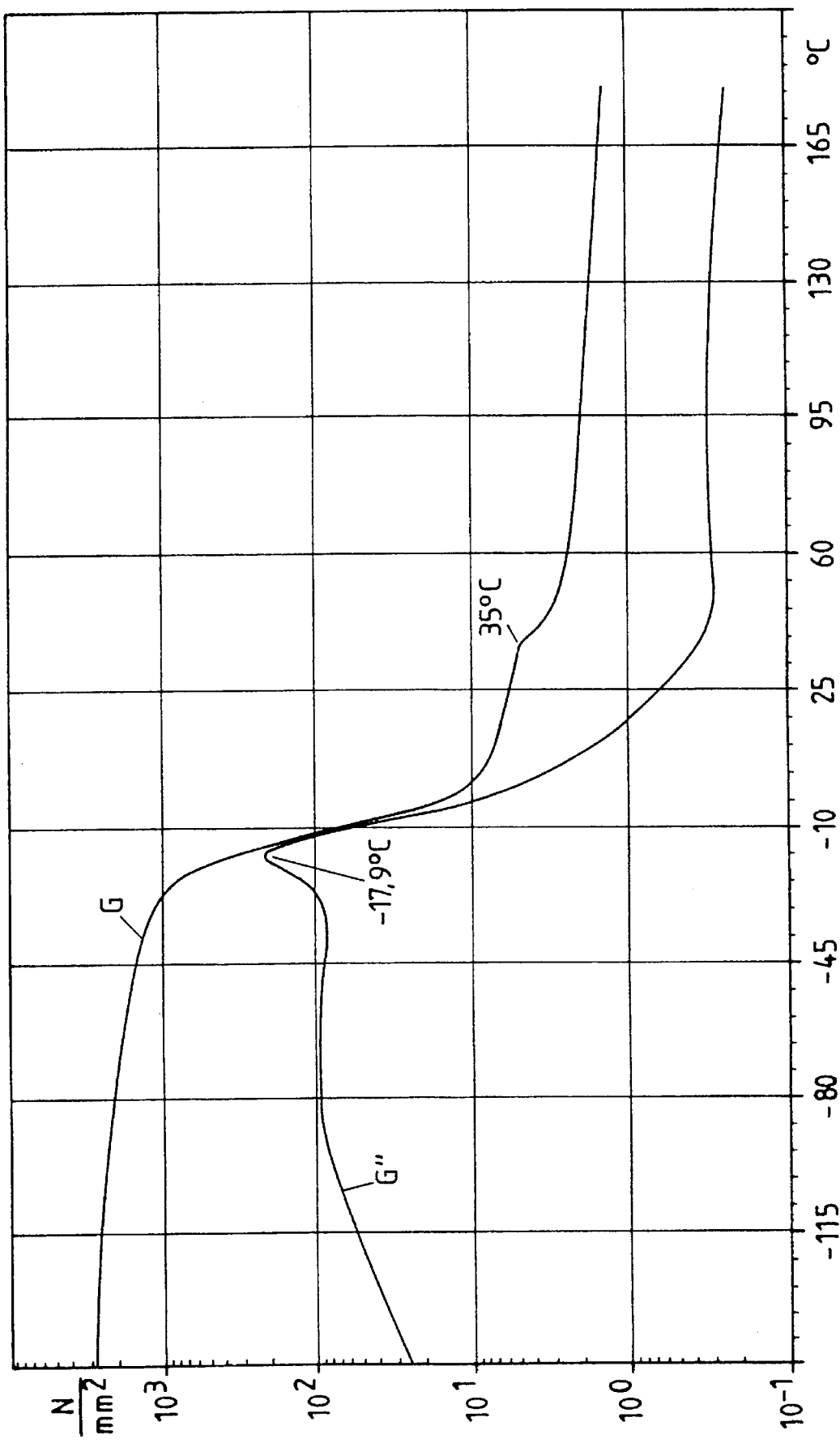
FIGS. 1 and 2 are comparative module-in-torsion curves, as a function of temperature.
Figure 2:
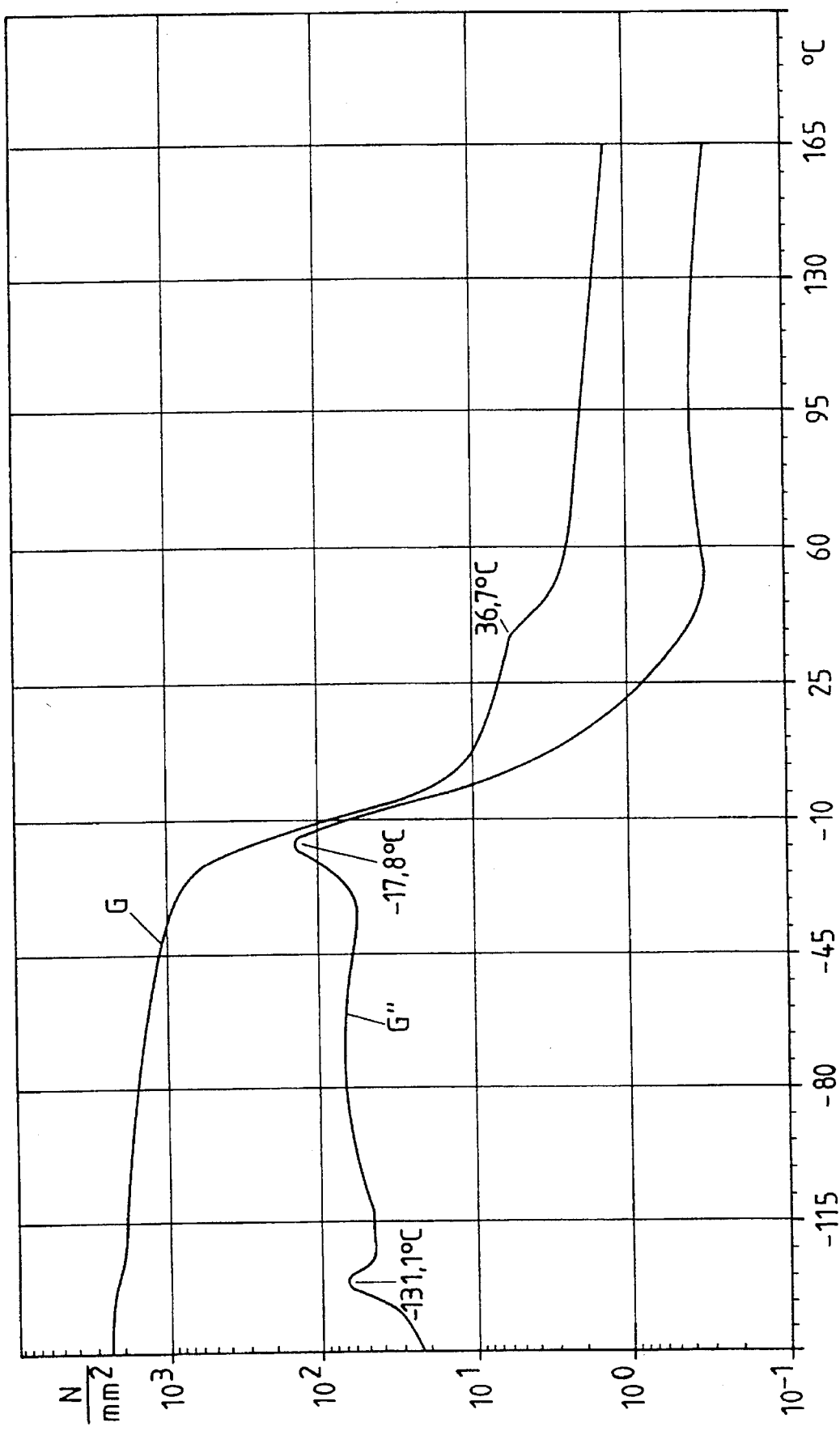
Figure 3A:
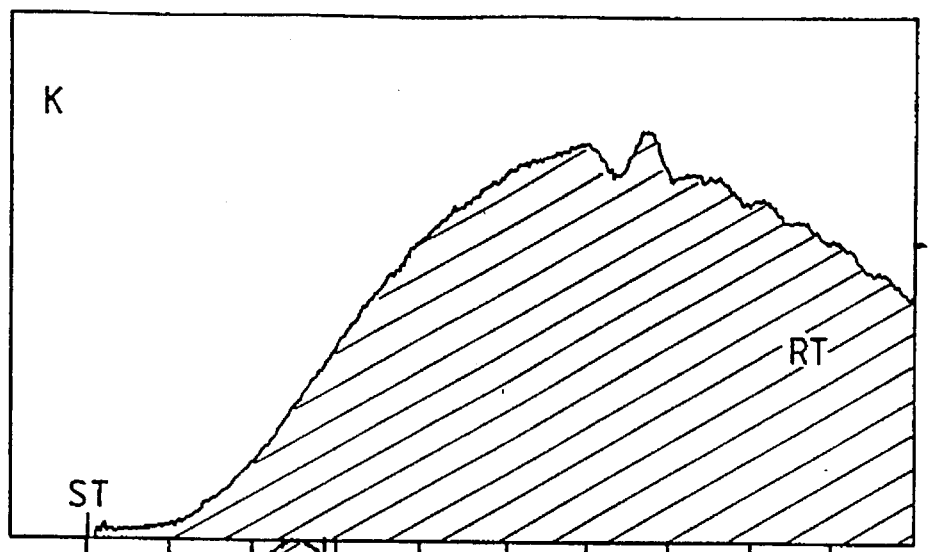
FIGS. 3 and 4 are comparative energy absorption curves.
Figure 3B:
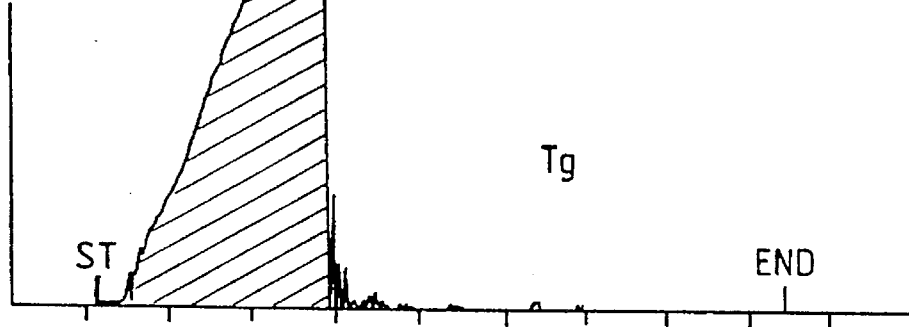
Figure 3C:
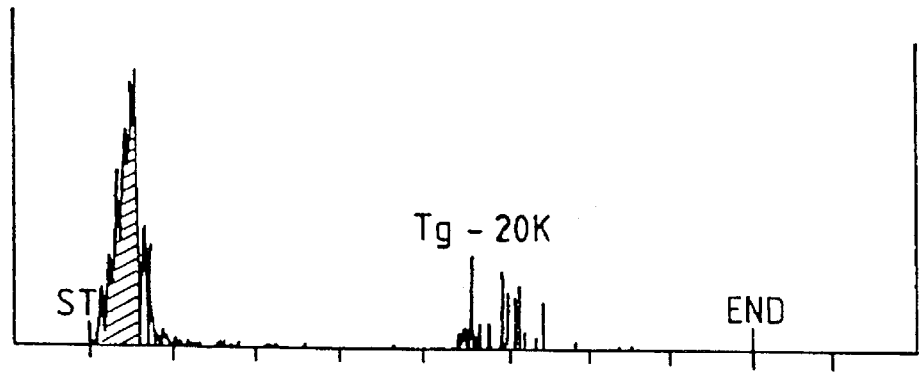
Figure 3D:
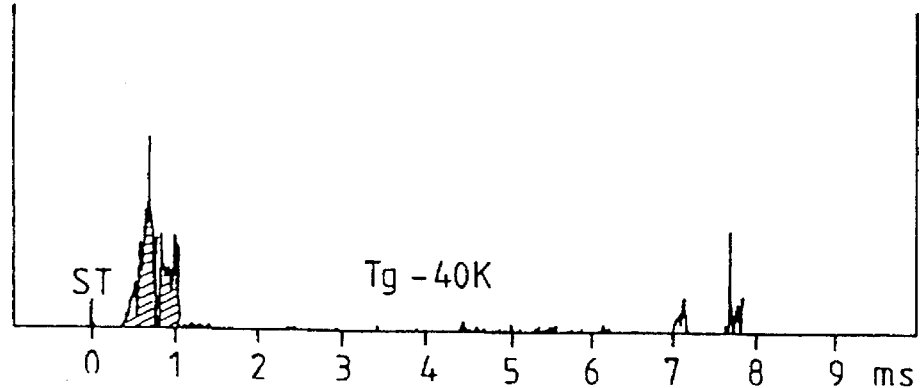
Figure 4A:
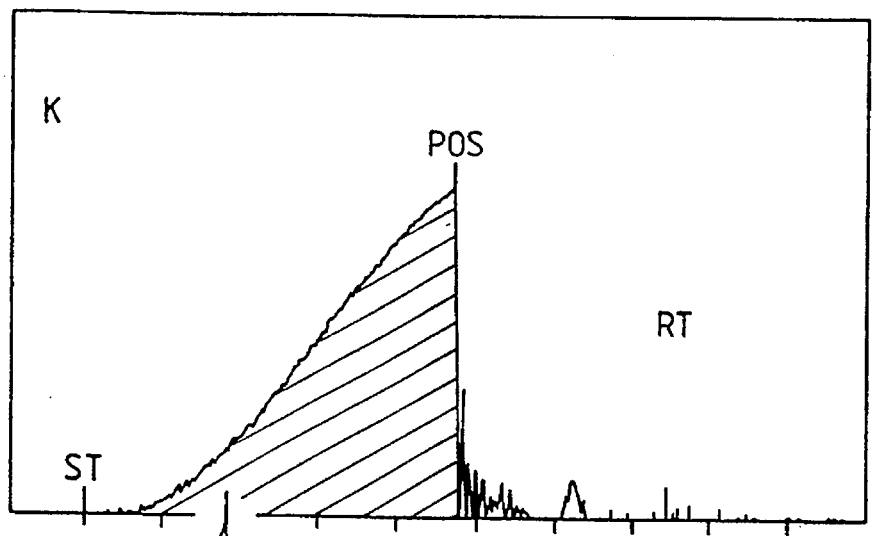
Figure 4B:
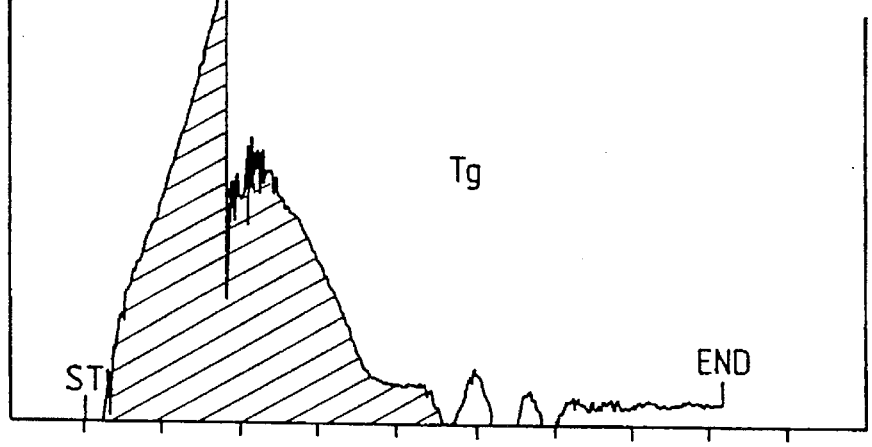
Figure 4C:
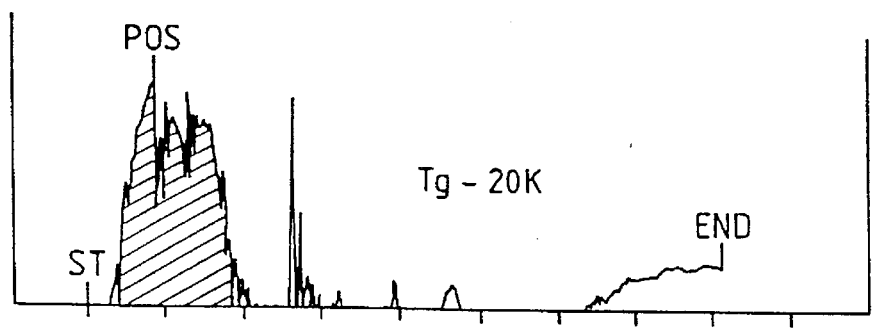
Figure 4D:
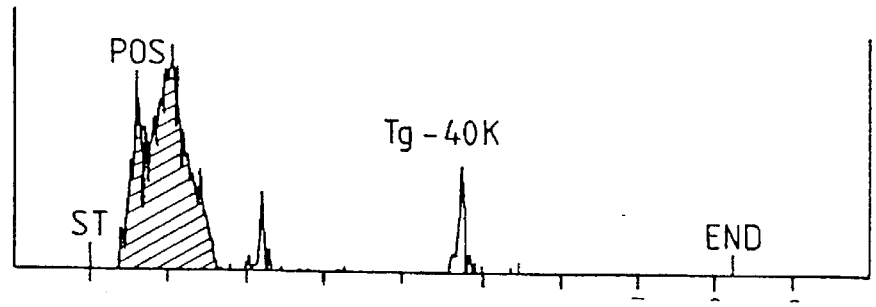

Referring now more particularly to the drawings, FIGS. 1 and 2 show by way of example module-in-torsion curves G and G", as a function of temperature, in respect of a sample in accordance with the Comparative Example (FIG. 1) and Example 1d (FIG. 2).

The curves were plotted at a heating-up time of 1° C./min. The second moment of area was 102.47 kg mm². The thickness of the sample of the Comparative Example was 1.12 mm, and that of Example 1d 1.23 mm.

FIG. 1 shows the glass transition of the fluoropolymer as a peak on the G" curve at approximately −18° C.

FIG. 2 additionally shows the glass transition of the silicone plate at −131° C. The glass transition of the pure silicone phase is normally approximately −120° C. The shift to lower temperatures is indicative of marked coupling effects between the acrylate mantle and the fluoropolymer matrix.

The glass transition of the fluoropolymer matrix is substantially unchanged at approximately −18° C., although it does exhibit slight asymmetrical broadening. The glass transition of the acrylate mantle is concealed in the G" background in the region between −35° and −45° C.

The improved low temperature brittle point of the fluorocarbon rubbers modified according to the invention is confirmed by plate penetration tests performed using a recording dropping apparatus.

The energy absorption under multiaxial impact stressing was measured over a wide temperature range in accordance with DIN 53 443.

FIGS. 3 and 4 show the load/time curves determined at 25° C., $[T_g(1)]$°C., $[T_g(1)-25]$° C. and $[T_g(1)-40]$° C. for the comparsion example and Example 5 (Table 2).

As expected, the pure fluorocarbon rubber (FIG. 3) displays high deformability and high energy absorption at 25° C.

By contrast, the modified system (FIG. 4) is considerably less deformable. As can be seen directly from FIGS. 3 and 4, the energy absorption at $[T_g(1)-25]$° C. and $[T_g(1)-40°]$° C. is considerably greater in the system modified according to the invention than in the pure fluorocarbon rubber.

In the plate penetration test—see FIG. 5 (pure fluorocarbon rubber) and FIG. 6 (modified fluorocarbon rubber)—cracks are formed in both samples at $T_g$; these cracks emanate from the point of penetration, beginning at an early stage and rapidly becoming instable. At low temperatures, the fracture behaviour of the modified fluorocarbon rubber can be described as considerably less brittle.

As used herein the following terms have the following meanings:

CTFE=Chlorotrifluoroethylene
PFP=Pentafluoropropene
HFIB=Hexafluoroisobutylene
HFP=Hexafluoropropene
PFAVE=Perfluoro(alkylvinylether)
VDF=1,1-difluoroethylene
TFE=Tetrafluoroethylene.

It will be understood that the specification and examples are illustrative but not limitative of the present invention and that other embodiments within the spirit and scope of the invention will suggest themselves to those skilled in the art.

We claim:

1. A radically vulcanizable blend of a fluorocarbon rubber and a silicone rubber comprising
    a) 2 to 65 parts by weight of silicone-core, acrylate-shell rubber particles dispersed within
    b) 98 to 35 parts by weight of a fluorocarbon rubber which is at least partially compatible and radically cross-linkable with the acrylate-shell of said silicone-core, acrylate-shell particles, and
    wherein said silicone-core, acrylate-shell particles are themselves comprised of from 50 to 95 parts by weight of a silicone and from 5–50 parts by weight of an acrylate.

2. A blend according to claim 1, wherein the silicone core comprises an at least partially cross-linked polyorganosiloxane and the acrylate-shell comprises an at least partially crosslinked acrylate copolymer.

3. A blend according to claim 1, wherein said particles have a diameter of from 0.1 to 3 μm.

4. A process for the preparation of a blend according to claim 1, which comprises mixing aqueous dispersions of the fluorocarbon rubber and of the silicone/acrylate core/shell rubber, and co-precipitating the rubbers out of the resulting mixed emulsion.

5. A process for the preparation and use of a blend according to claim 1, which comprises mixing aqueous suspensions of the fluorocarbon rubber and of the silicone/acrylate core/shell rubber, applying the resulting mixed emulsion to a surface and then vulcanizing the coating.

6. A rubber produced by vulcanizing a blend according to claim 1.

7. A cross-linkable blend according to claim 1, wherein the radically vulcanizable fluorocarbon rubber a) contains reactive sites for peroxidic cross-linking and contains units of 1,1,-difluoroethylene or tetrafluoroethylene or both, and at least one further fluoroolefin which is copolymerizable therewith, or chlorotrifloroethylene, hexafluoropropene, pentafluoropropene, hexafluoroisobutylene, perfluoro (alkylvinylether) which optionally additionally contains non-fluorine containing monomers.

* * * * *

UNITED STATES PATENT AND TRADEMARK OFFICE
CERTIFICATE OF CORRECTION

PATENT NO. : 5,587,424
DATED : December 24, 1996
INVENTOR(S) : Langstein, et al.

It is certified that error appears in the above-indentified patent and that said Letters Patent is hereby corrected as shown below:

Col. 12, claim 7, line 6    Delete " chlorothrifloroethylene " and substitute -- chlorotrifluoroethylene --

Signed and Sealed this

Twenty-ninth Day of April, 1997

Attest:

Attesting Officer

BRUCE LEHMAN

Commissioner of Patents and Trademarks